(12) United States Patent
Wiegman

(10) Patent No.: US 12,474,715 B2
(45) Date of Patent: *Nov. 18, 2025

(54) SYSTEM AND METHOD FOR INITIATING A COMMAND OF AN ELECTRIC AIRCRAFT

(71) Applicant: BETA AIR LLC, South Burlington, VT (US)

(72) Inventor: Herman Wiegman, Essex Junction, VT (US)

(73) Assignee: BETA AIR LLC, South Burlington, VT (US)

( * ) Notice: Subject to any disclaimer, the term of this patent is extended or adjusted under 35 U.S.C. 154(b) by 195 days.

This patent is subject to a terminal disclaimer.

(21) Appl. No.: 18/090,306

(22) Filed: Dec. 28, 2022

(65) Prior Publication Data

US 2023/0168691 A1 Jun. 1, 2023

Related U.S. Application Data

(63) Continuation of application No. 17/383,548, filed on Jul. 23, 2021, now Pat. No. 11,561,557.

(51) Int. Cl.
| | |
|---|---|
| *G05D 1/06* | (2006.01) |
| *G05D 1/00* | (2006.01) |
| *G05D 1/08* | (2006.01) |
| *G06F 18/21* | (2023.01) |
| *G06F 18/214* | (2023.01) |
| *G06N 20/00* | (2019.01) |
| *G06V 20/13* | (2022.01) |
| *G06V 20/17* | (2022.01) |

(52) U.S. Cl.
CPC ........ *G05D 1/0669* (2013.01); *G05D 1/0858* (2013.01); *G06F 18/214* (2023.01); *G06N 20/00* (2019.01); *G06V 20/13* (2022.01); *G06V 20/17* (2022.01)

(58) Field of Classification Search
CPC .... G05D 1/0669; G05D 1/0858; G06N 20/00; G06V 20/00; G06V 20/13; G06V 20/17; G06F 18/214
USPC .......................................................... 701/3
See application file for complete search history.

(56) References Cited

U.S. PATENT DOCUMENTS

| | | | |
|---|---|---|---|
| 2005/0080562 A1* | 4/2005 | Neregard | G01C 21/165 342/357.3 |
| 2019/0066522 A1* | 2/2019 | Sweet, III | G08G 5/21 |
| 2019/0220039 A1* | 7/2019 | Wu | G05D 1/0676 |
| 2020/0258400 A1* | 8/2020 | Yuan | G06F 18/2413 |
| 2020/0354049 A1* | 11/2020 | Noppel | B64C 29/0033 |

* cited by examiner

*Primary Examiner* — Adam D Tissot
(74) *Attorney, Agent, or Firm* — Lee & Hayes, P.C.

(57) ABSTRACT

A system for initiating a command of an electric vertical take-off and landing (eVTOL) aircraft includes a flight controller configured to receive a topographical datum, receive a sensor datum from a sensor, identify an air position as a function of the sensor datum and the topographical datum, determine a command, including an actuator command, as a function of the identified air position and the determining of the command includes identifying at least one flight component of the eVTOL aircraft to be adjusted to perform the determined command, and initiate the command to adjust the identified flight component.

20 Claims, 7 Drawing Sheets

SYSTEM AND METHOD FOR INITIATING A COMMAND OF AN ELECTRIC AIRCRAFT

CROSS-REFERENCE TO RELATED APPLICATIONS

This application is a continuation of U.S. Nonprovisional patent application Ser. No. 17/383,548, filed on Jul. 23, 2021, and entitled "SYSTEM AND METHOD FOR INITIATING A COMMAND OF AN ELECTRIC VERTICAL TAKE-OFF AND LANDING (EVTOL) AIRCRAFT," which is incorporated by reference herein in its entirety.

FIELD OF THE INVENTION

The present invention generally relates to the field of electric aircrafts. In particular, the present invention is directed to a system and method for initiating a command of an electric vertical take-off and landing (eVTOL) aircraft.

BACKGROUND

Electric vertical take-off and landing (eVTOL) aircrafts are frequently incapable of determining air position due to insufficient and/or unattractive navigational systems, such as global positioning systems (GPS). Specifically, GPS is not as accurate in determining altitude and other techniques that determine altitude, such as barometers, are disturbed and/or distorted by common flight components such as propellers and/or rotors. This is further complicated by the plurality of buildings and/or structures that extend into air space of eVTOL aircrafts.

SUMMARY OF THE DISCLOSURE

In an aspect, a system for initiating a command of an electric vertical take-off and landing (eVTOL) aircraft is disclosed. The system includes a flight controller configured to receive a topographical datum, receive a sensor datum from a sensor, identify an air position as a function of the sensor datum and the topographical datum, determine a command, including an actuator command, as a function of the identified air position and the determining of the command includes identifying at least one flight component of the eVTOL aircraft to be adjusted to perform the determined command, and initiate the command to adjust the identified flight component.

In another aspect, a method for initiating a command of an electric vertical take-off and landing (eVTOL) aircraft is disclosed. The method includes receiving, by a flight controller, a topographical datum, receiving, using the flight controller, a sensor datum from a sensor, identifying, by the flight controller, an air position as a function of the sensor datum and the topographical datum using a similarity function. The method further includes determining, by the flight controller, a command for at least one flight component of the eVTOL aircraft as a function of the air position, wherein the command includes an actuator command and the determining of the command comprises identifying at least one flight component of the eVTOL aircraft to be adjusted to perform the determined command, initiating, by the flight controller, the command to adjust the identified flight component.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At a high level, aspects of the present disclosure are directed to systems and methods for initiating a command of an eVTOL aircraft. In an embodiment, this disclosure can receive a topographical datum. Aspects of the present disclosure can be used to identify an air position as a function of a sensor and the topographical datum. This is so, at least in part, because the disclosure includes a similarity function. Aspects of the present disclosure can also be used to determine a command as a function of the air position. Aspects of the present disclosure allow for initiating the command. Exemplary embodiments illustrating aspects of the present disclosure are described below in the context of several specific examples.

Figure 1:
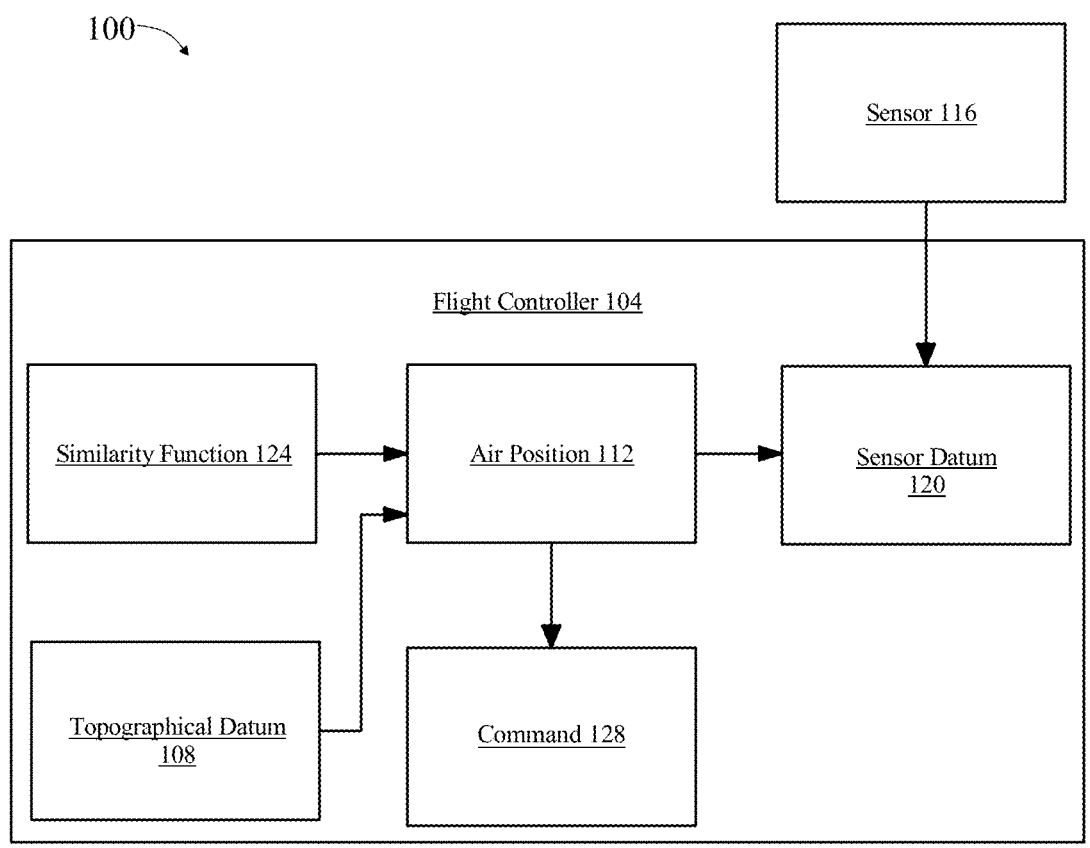
FIG. 1 is a block diagram of a system for initiating a command of an electric vertical take-off and landing (eVTOL) aircraft according to an embodiment of the invention.

Referring now to FIG. 1, an exemplary embodiment of a system 100 for initiating a command of an electric vertical take-off and landing (eVTOL) aircraft is illustrated. System includes a flight controller 104. As used in this disclosure a "flight controller" is a computing device of a plurality of computing devices dedicated to data storage, security, distribution of traffic for load balancing, and flight instruction. Flight controller 104 may include and/or communicate with any computing device as described in this disclosure, including without limitation a microcontroller, microprocessor, digital signal processor (DSP) and/or system on a chip (SoC) as described in this disclosure. Further, flight controller 104 may include a single computing device operating independently, or may include two or more computing device operating in concert, in parallel, sequentially or the like; two or more computing devices may be included together in a single computing device or in two or more computing devices. In embodiments, flight controller 104 may be installed in an aircraft, may control the aircraft remotely, and/or may include an element installed in the aircraft and a remote element in communication therewith.

In an embodiment, and still referring to FIG. 1, flight controller 104 may include a reconfigurable hardware platform. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform may be reconfigured to enact any algorithm and/or algorithm selection process received from another computing device and/or created using machine-learning and/or neural net processes as described below.

Still referring to FIG. 1, flight controller 104 may include, be included in, and/or communicate with a mobile device such as a mobile telephone or smartphone. Further, flight controller 104 may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 1, flight controller 104 may include, but is not limited to, for example, a cluster of computing devices in a first location and a second computing device or cluster of computing devices in a second location. Flight controller 104 may include one or more computing devices dedicated to data storage, security, distribution of traffic for load balancing, and the like. Flight controller 104 may be configured to distribute one or more computing tasks as described below across a plurality of computing devices of computing device, which may operate in parallel, in series, redundantly, or in any other manner used for distribution of tasks or memory between computing devices. Flight controller 104 may also be implemented using a "shared nothing" architecture in which data is cached at the worker, in an embodiment, this may enable scalability of aircraft 100 and/or computing device.

In an embodiment, and with continued reference to FIG. 1, flight controller 104 may be designed and/or configured to perform any method, method step, or sequence of method steps in any embodiment described in this disclosure, in any order and with any degree of repetition. For instance, flight controller 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, flight controller 104 is configured to receive a topographical datum 108. As used in this disclosure a "topographical datum" is an element of data representing the arrangement and/or location of a physical feature of a geolocation. For example, and without limitation, topographical datum 108 may include one or more elements of datum denoting a mountain range, skyscraper, river, ridge, ocean, lake, vehicle, animal, person, street, field, tree, and the like thereof. In an embodiment, and without limitation, topographical datum 108 may include data denoting a ToF datapoint, a LIDAR image, a 3D file, an image file, and the like thereof. For example, and without limitation, topographical datum 108 may denote a 3D file representing a mountain range. As a further non-limiting example, topographical datum 108 may denote a LIDAR image of a physical feature of a geolocation. In an embodiment, topographical datum 108 may include one or more altitude elements. As used in this disclosure an "altitude element" is an element of data that denotes a vertical distance from the ground that a physical feature of a geolocation comprises. For example, and without limitation, altitude element may denote that a mountain range extends to 1,000 m above sea level. As a further non-limiting example, altitude element may denote that a skyscraper extends 200 m above the ground on which the skyscraper resides. In an embodiment, and without limitation, altitude element may denote one or more airspace occupancies. For example, and without limitation, altitude element may denote that a building and/or object resides in a tiered airspace highway, such as but not limited to class alpha airspace, class beta airspace, class Charlie airspace, class delta airspace, class echo airspace, and the like thereof.

In an embodiment, and still referring to FIG. 1, receiving topographical datum 108 may include obtaining a ground feature. As used in this disclosure a "ground feature" is a physical feature and/or object that is located on the ground directly beneath eVTOL aircraft. For example, and without limitation, ground feature may denote that an ocean is directly beneath and/or below eVTOL aircraft. As a further non-limiting example, ground feature may denote that a city and/or town is directly beneath eVTOL aircraft. In an embodiment, and without limitation, ground feature may be obtained as a function of a ground database. As used in this disclosure a "ground database" is a datastore of a plurality of previously identified and/or known ground features. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure. In an embodiment, and without limitation, ground database may be a culmination of a plurality of data such as but not limited to data comprising publicly-available data, such as satellite images and/or topographical and city data. In another embodiment, and without limitation, ground database may correspond to a plurality of air positions, wherein an air position is described below in detail. For example, and without limitation, ground database may denote that a first air position comprises a first ground feature as a function of a mountain range, wherein a second air position may comprise a second ground feature as a function of the mountain range. As a further non-limiting example, ground database may comprise a plurality of ground features as a function of where and/or when the data was taken. As a further non-limiting example, ground database may comprise a plurality of ground features as a function of a set of one or more distances from a ground feature and/or air position.

Still referring to FIG. 1, flight controller 104 is configured to identify an air position 112. As used in this disclosure an "air position" is a relative location and/or orientation of an aircraft relative to the topographical datum. For example, and without limitation, air position 112 may denote that an aircraft is located at a distance above a ground feature and/or physical object. Flight controller 104 is configured to identify air position 112 as a function of a sensor 116 and topographical datum 108. As used in this disclosure a "sensor" is a device, module, and/or subsystem, utilizing any hardware, software, and/or any combination thereof to detect events and/or changes in the instant environment and transmit the information. Sensor 116 may be attached via a mechanically and/or communicatively coupled to aircraft. As used herein, "communicatively connecting" is a process whereby one device, component, or circuit is able to receive data from and/or transmit data to another device, component, or circuit. A communicative connection may be achieved through wired or wireless electronic communication, either directly or by way of one or more intervening devices or components. Further, communicative connecting can include electrically coupling at least an output of one device, component, or circuit to at least an input of another device, component, or circuit. For example, via a bus or other facility for intercommunication between elements of a computing device as described in this disclosure. Communicative connecting may also include indirect connections via wireless connection, radio communication, low power wide area network, optical communication, magnetic, capacitive, or optical coupling, or the like. For example, and without limitation, sensor 116 may include a potentiometric sensor, inductive sensor, capacitive sensor, piezoelectric sensor, strain gauge sensor, variable reluctance sensor, and the like thereof. Sensor 116 may include one or more environmental sensors, which may function to sense parameters of the environment surrounding the aircraft. An environmental sensor may include without limitation one or more sensors used to detect ambient temperature, barometric pressure, and/or air velocity, one or more motion sensors which may include without limitation gyroscopes, accelerometers, inertial measurement unit (IMU), and/or magnetic sensors, one or more humidity sensors, one or more oxygen sensors, or the like. Additionally or alternatively, sensor 116 may include a geospatial sensor. Sensor 116 may be located inside aircraft; and/or be included in and/or attached to at least a portion of the aircraft. Sensor 116 may include one or more proximity sensors, displacement sensors, vibration sensors, and the like thereof. Sensor 116 may be used to monitor the status of aircraft for both critical and non-critical functions. Sensor 116 may be incorporated into vehicle or aircraft or be remote. Sensor 116 may be communicatively connected to an energy source and/or motor, wherein an energy source and motor are described in detail below, in reference to FIG. 2, and wherein sensor detects one or more conditions of the energy source and/or motor.

Still referring to FIG. 1, sensor 116 may include a navigation facility receiver. As used in this disclosure a "navigation facility receiver" is sensor and/or receiver that may locate and/or identify a location of an aircraft with respect to a geolocation. For example and without limitation, navigation facility receiver may include a global positioning system (GPS) receiver. As a further non-limiting example, navigation facility receiver may include a global navigation satellite system (GLONASS) receiver. As a further non-limiting example, navigation facility receiver may include a BeiDou receiver. As a further non-limiting example, navigation facility receiver may include a Galileo receiver. As a further non-limiting example, navigation facility may include a NAVIC receiver. In an embodiment, navigation facility system may include one or more satellite constellation receivers and/or similar emitting systems that can calculate a location based on the time and/or phase difference of the receiver signals. In an embodiment, and without limitation, navigation facility receiver may include a receiving antenna, accompanying circuits, and processing. One or more navigation facility receivers may be configured to determine the orientation of the aircraft in relation to the Earth's true North, using differential GPS, phase differences, and/or other methods to exploit the satellite constellations and their positions. One or more facility navigation receivers may be configured to receive and determine the local time based on the time information received from the satellite signals. One or more navigation facility receivers may receive position and timing signals, and the like and convert such detected signals into electrical signals, which may be processed further by flight controller 104 as described in further detail below.

Still referring to FIG. 1, sensor 116 may include an optical sensor. As used in this disclosure "an "optical sensor" is an electronic device that alters any parameter of an electronic circuit when contacted by visible or MR light. Optical detectors may include, without limitation, charge-coupled devices (CCD), photodiodes, avalanche photodiodes (APDs), silicon photo-multipliers (SiPMs), complementary metal-oxide-semiconductor (CMOS), scientific CMOS (sC-MOS), micro-channel plates (MCPs), micro-channel plate photomultiplier tubes (MCP-PMTs), single photon avalanche diode (SPAD), Electron Bombarded Active Pixel Sensor (EBAPS), quanta image sensor (QIS), spatial phase imagers (SPI), quantum dot cameras, image intensification tubes, photovoltaic imagers, optical flow sensors and/or imagers, photoresistors and/or photosensitive or photon-detecting circuit elements, semiconductors and/or transducers. APDs, as used herein, are diodes (e.g. without limitation p-n, p-i-n, and others) reverse biased such that a single photon generated carrier can trigger a short, temporary "avalanche" of photocurrent on the order of milliamps or more caused by electrons being accelerated through a high field region of the diode and impact ionizing covalent bonds in the bulk material, these in turn triggering greater impact ionization of electron-hole pairs. APDs may provide a built-in stage of gain through avalanche multiplication. When a reverse bias is less than breakdown voltage, a gain of an APD may be approximately linear. For silicon APDs this gain may be on the order of 10-100. The material of the APD may contribute to gains.

Still referring to FIG. 1, optical sensor may include a light radar component. As used in this disclosure a "light radar component" is an active imaging source that transmits light toward an object or field of interest and detects back-scattered or reflected light, measuring time of flight (ToF), interferometry, and/or phase of such back-scattered and/or reflected light to compute distances to, velocities, and/or accelerations of objects at points from which back-scatter and/or reflection occurred. In an embodiment, the wavelength of light may be outside the range of visible light; for instance, and without limitation, wavelength may be in the infrared range as described above. Light radar component may include a "flash lidar" component, mechanical or non-mechanical beam steering, light patterns, and/or computational imaging methods, such as plenoptic or other multi-aperture embodiments. In an embodiment, and without limitation, light radar component may include one or more optical elements for focusing, collimating, and/or transmitting light emitted by light source. In an embodiment, intensity and/or focus may default to minimally harmful settings, permitting allowing ToF ranging or the like to determine a distance to a nearest topographical data point and/or ground point. Light radar component may include detectors that may be sensitive specifically to a narrow band of wavelengths transmitted by light source, and/or may be sensitive to a range of wavelengths that includes the band transmitted by the light source. Detectors may be designed to react quickly to initial detection of photons, for instance through use of APDs or other highly sensitive detectors such as but not limited to ToF detectors. In an embodiment and without limitation, Light radar component may include a phase-based laser scanner. As used in this disclosure a "phase-based laser scanner" is a component that measures a phase shift of a constant beam of laser energy. In an embodiment, and without limitation, phase-based laser scanner may calculate a distance as a function of the measurement of the phase shift of the returning laser energy.

In an embodiment, and still referring to FIG. 1, air position 112 may be identified as a function of performing a ToF calculation as a function of the one or more light radar components by firing pulses of light and measuring time required for a backscattered and/or reflected pulse to return. As a further non-limiting example, ToF may be used to measure a distance from light radar component to a point from which light is scattered; this may be used, without limitation, to detect distance to a topographical datum such as a building. Distance may be computed using a single reading of ToF, by averaging two or more ToF readings, and/or measuring multiple returns to reduce false readings from clutter. ToF may be used to detect edges of objects such as an edge of a cliff. ToF may be used to generate an image, for instance by repeatedly capturing readings of ToF to different portions of an object and/or topographical datum; a three-dimensional surface contour of the object, such as facial features, details of an object a person is holding, or the like, may be rendered using the ToF data. ToF measurements may be processed to generate a depth map or point cloud, defined for the purposes of this disclosure as a set of Z-coordinate values for every pixel of the image, which may be measured in units of millimeters, micrometers, or the like. Depth map data may be combined with other imaging data; for instance, intensity or phase values of pixels in an infrared reading may be measured as proportional to an amount of light returned from a scene.

Still referring to FIG. 1, sensor 116 may include a ranging sensor. As used in this disclosure a "ranging sensor" is an electronic device that receives, stores, and/or transmits one or more elements of spatial information. For example, and without limitation, ranging sensor may receive a temporal indicator. As used in this disclosure a "temporal indicator" is an element of datum denoting a time and/or temporal element. For example, and without limitation, temporal indicator may include a time period, wherein a time period is a magnitude of time elapsed, such as but not limited to seconds, minutes, hours, days, weeks, months, years, and the like thereof. For example, and without limitation, temporal indicator may denote a time period that aircraft has been in flight and/or traveling in a medium, such as but not limited to air. As a further non-limiting example, temporal indicator may denote a time period that aircraft has been idling and/or stationary. As a further non-limiting example, temporal indicator may denote a time period that aircraft has been at a cruising altitude. As a further non-limiting example, temporal indicator may denote a time period that aircraft has been climbing and/or descending from a cruising altitude. As a further non-limiting example, temporal indicator may denote a time period that a motor has been expending energy. As a further non-limiting example, temporal indicator may denote a time period that a torque and/or thrust has been exerted by a flight component, wherein a flight component is described below in detail.

In an embodiment, and still referring to FIG. 1, ranging sensor may be configured to calculate a distance as a function of the temporal indicator and the navigation signal. As used in this disclosure a "distance" is a measurement of travel and/or progress that has progressed. For example, and without limitation distance may denote a number of kilometers and/or miles that have been traveled. As a further non-limiting example, distance may denote a progression of distance traveled as a function of a required distance to be traveled. In an embodiment, distance may denote one or more replacement points. As used in this disclosure a "replacement point" is a distance and/or progression interval in which a component and/or aircraft has deteriorated. For example, and without limitation, replacement point may denote that an aircraft has 1200 km remaining prior to requiring maintenance. As a further non-limiting example, replacement point may denote that a flight component has 5% remaining prior to requiring a replacement component.

Still referring to FIG. 1, according to some embodiments, sensor 116 may include any of an electro-optical sensor, an image capture sensor, a machine-vision system, a high-speed camera, a thermal imaging camera, a multispectral camera, a pressure sensor, and the like. In some cases, sensor 116 may be configured to sense a characteristic of an electric motor, such as without limitation as is on a propulsor. In some cases, sensor 116 may be configured to sense any motor characteristic including, without limitation, current, vibration, stray flux, light polarization changes resulting from external magnetic field according to Faraday principle, partial discharge, acoustics, temperature, and the like. In some cases, sensor may be configured to sense a characteristic associated with a motor at a substantially steady-state. For example, in some cases motor current signal analysis may be performed under state-state motor conditions. Alternatively, sensor 116 may be configured to sense a characteristic associated with motor in a transient operating condition. Non-limiting exemplary transient operating conditions include motor start-up, motor load variations, plugging stop, regenerative braking, dynamic braking, acceleration, deceleration, supply frequency changes, and the like. In some cases, sensor 116 may sense a motor characteristic which may be further analyzed, for example by way of one or more transforms. In some cases, motor characteristic may be analyzed using a time-frequency transform. Non-limiting time-frequency transforms may include any of discrete wavelet transform, undecimated discrete wavelength transform, wavelet packets, continuous wavelet transform, Hilbert-Huang transform, Wigner-Ville distribution, Choi-Williams distribution, and the like. In some cases, a discrete transform (e.g., discrete wavelet transform) may be advantageously utilized for continual monitoring of motor, because of reducing processing requirements of the discrete transform. Alternative or additionally, a continuous transform may be used for finer more accurate analysis. In some cases, a time-frequency transform may be used to analyze a motor current draw signal. Alternatively or additionally a time-frequency transform may be used to analyze a motor vibration signal, a stray flux signal, and/or an optical polarization signal. An exemplary embodiment is provided below in which transient analysis of motor current during startup is analyzed using time-frequency transform.

Still referring to FIG. 1, evolution of frequency over time during transient motor conditions may be indicative of motor health. In some cases, steady state motor conditions may be used. For example, lower sideband harmonics and/or upper sideband harmonics present under steady state conditions may be indicative of motor rotor damage. Alternatively or additionally, in some cases, it may be advantageous to sense and analyze motor characteristics during transient motor states. As an electric motor undergoes startup, frequency, as revealed through a time-frequency transform of motor current, evolves over time. Transient motor condition analysis may be used because generally fault harmonics, which fall at specific frequency values at steady-state (e.g., sidebands), change in frequency and time under transient operation. As an exemplary embodiment, Lower Sideband Harmonic (LSH), which may be associated with rotor damages, may be detected during motor startup. LSH frequency may be given as $$f_{LSH} = f*(1-2*s)$$

where $f_{LSH}$ is lower sideband harmonic frequency, f is supply frequency, and s is slip. Slip may be given as $$s = \frac{n_s - n}{n_s}$$

where $n_s$ is synchronous speed, and n is motor speed. Under steady-state motor conditions, LSH frequency will remain substantially stable. However, under transient motor conditions LSH frequencies may change in a characteristic manner, in coherence with variation of the above parameters. For instance, during direct stating of an induction motor slip decreases from s=1 (when motor is connected) to near zero (when steady-state regime is reached) Consequently, frequency of LSH may evolve in a predictable manner during startup. For example, $f_{LSH}$ may be substantially equal to supply frequency at startup, drop to nearly zero, and then increase again to about equal to that the supply frequency. Frequency evolution for lower sideband harmonics may therefore exhibit a telltale V-pattern during startup, when time-frequency transform of motor current is plotted. Time-frequency transform analysis has been shown to be useful with a motor current signal, in some cases, time-frequency transform analysis may be used on other motor signals to determine motor health.

Still referring to FIG. 1, identifying air position 112 includes obtaining a sensor datum 120 as a function of sensor 116. As used in this disclosure a "sensor datum" is an element of data denoting one or more distances, angles, orientations, speeds, velocities, forces, visual representations and the like thereof from the ground and/or physical elements of the ground. For example, and without limitation, sensor datum may denote that eVTOL aircraft is 500 m above ground. As a further non-limiting example, sensor datum may denote that eVTOL aircraft is angled at 3° eastward, wherein eVTOL aircraft is traveling at a velocity of 910 km/h. Additionally or alternatively, sensor datum 120 may denote an inertial measurement. As used in this disclosure an "inertial measurement" is an element of datum denoting one or more forces, angular rates, and/or orientations. For example, and without limitation, inertial measurement may include a measurement of 5 m/s² for an aircraft's acceleration in a northeastern direction. In an embodiment, inertial measurement may include generating a moving map display. As used in this disclosure a "moving map display" is a digital map archive representing one or more position outputs. For example, and without limitation, moving map display may identify one or more movements, orientations, and/or velocities of aircraft over a digital map. In an embodiment, and without limitation, inertial measurement may be determined as a function of magnetic sensors or magnetometers such as Hall effect sensors, compasses such as solid-state compasses, or the like; one or more magnetometers may include a plurality of magnetometers, such as three or more magnetometers positioned to span three dimensions of possible orientation, so that any direction and magnitude of change in magnetic field in three dimensions may be detected and measured in three dimensions, possibly for measurement of the aircraft's orientation to the Earth's true North or detection of magnetic anomalies. In another embodiment, inertial measurement may be determined as a function of a MEMS sensor, inertial measurement unit (IMU), an accelerometer, wherein one or more accelerometers may include a plurality of accelerometers, such as three or more accelerometers positioned to span three dimensions of possible acceleration, so that any direction and magnitude of acceleration in three dimensions may be detected and measured in three dimensions, and the like thereof. In another embodiment, and without limitation, inertial measurement may be determined as a function of one or more gyroscopes; one or more gyroscopes may include a plurality of gyroscopes, such as three or more gyroscopes positioned to span three dimensions of possible acceleration, so that any direction and magnitude of change in angular position in three dimensions may be detected and measured in three dimensions. In an embodiment, and without limitation, ground database may be updated as a function of sensor datum 120. For example, sensor datum 120 may denote a last known position and/or direction of eVTOL aircraft, wherein ground database may be updated as a function of sensor datum 120. Additionally or alternatively, sensor datum 120 may denote one or more images and/or visual representations of a ground location such as snapshots, pictures, videos, and the like thereof.

Still referring to FIG. 1, flight controller 104 may identify air position 112 as a function of sensor datum 120 and topographical datum 108 using a similarity function 124. As used in this disclosure a "similarity function" is a function and/or method for comparing topographical datum 108 and sensor datum 112. In an embodiment, and without limitation, similarity function 124 may calculate the distance between the topographical datum 108 and sensor datum 120 using any suitable norm such as cosine similarity, Euclidean distance measurement, classifier, machine-learning process, and/or the like thereof. In an embodiment, and without limitation, similarity function 124 may include a similarity metric and/or other numeric value representing the similarity as a function of topographical datum 108 and/or sensor datum 116. For example, and without limitation, a sum of differences such as but not limited to absolute differences between topographical datum distances and/or sensor datum distances may be calculated. In an embodiment, and without limitation, this process may be repeated for a plurality of distance datasets in the ground feature database and/or topographical datum, wherein the plurality of distance datasets corresponds to a plurality of air positions, and wherein the difference with the lowest sum may be selected. In an embodiment, the air position corresponding to the selected distance dataset may be the identified air position. Additionally or alternatively, and without limitation, similarity function may include generating an image vector. As used in this disclosure an "image vector" is a data structure that represents one or more quantitative values and/or measures distance as a function of an image. A vector may be represented as an n-tuple of values, where n is one or more values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\Sigma_{i=0}^{n}a_i^2}$, where $a_i$ is attribute number i of the vector. Scaling and/or normalization may function to make vector comparison independent of absolute quantities of attributes, while preserving any dependency on similarity of attributes. For example, and without limitation, image vector may denote that aircraft is 400 m above a known skyscraper comprising an altitude element of 300 m.

Still referring to FIG. 1, similarity function 124 may include a feature learning algorithm. A "feature learning algorithm," as used herein, is a machine-learning algorithm that identifies associations between elements of data in a data set, which may include without limitation a training data set, where particular outputs and/or inputs are not specified. For instance, and without limitation, a feature learning algorithm may detect co-occurrences of sets of pixels and/or distances with each other. As a non-limiting example, feature learning algorithm may detect co-occurrences of images with each other. Flight controller 104 may perform a feature learning algorithm by dividing images from image capture sensors and/or optical sensors into various sub-combinations of such data such as, but not limited to pixels. In an embodiment, feature learning algorithm may perform clustering of data.

Continuing refer to FIG. 1, a feature learning and/or clustering algorithm may be implemented, as a non-limiting example, using a k-means clustering algorithm. A "k-means clustering algorithm" as used in this disclosure, includes cluster analysis that partitions n observations or unclassified cluster data entries into k clusters in which each observation or unclassified cluster data entry belongs to the cluster with the nearest mean. "Cluster analysis" as used in this disclosure, includes grouping a set of observations or data entries in way that observations or data entries in the same group or cluster are more similar to each other than to those in other groups or clusters. Cluster analysis may be performed by various cluster models that include connectivity models such as hierarchical clustering, centroid models such as k-means, distribution models such as multivariate normal distribution, density models such as density-based spatial clustering of applications with nose (DBSCAN) and ordering points to identify the clustering structure (OPTICS), subspace models such as biclustering, group models, graph-based models such as a clique, signed graph models, neural models, and the like. Cluster analysis may include hard clustering whereby each observation or unclassified cluster data entry belongs to a cluster or not. Cluster analysis may include soft clustering or fuzzy clustering whereby each observation or unclassified cluster data entry belongs to each cluster to a certain degree such as for example a likelihood of belonging to a cluster; for instance, and without limitation, a fuzzy clustering algorithm may be used to identify clustering of pixels with multiple distances, and vice versa. Cluster analysis may include strict partitioning clustering whereby each observation or unclassified cluster data entry belongs to exactly one cluster. Cluster analysis may include strict partitioning clustering with outliers whereby observations or unclassified cluster data entries may belong to no cluster and may be considered outliers. Cluster analysis may include overlapping clustering whereby observations or unclassified cluster data entries may belong to more than one cluster. Cluster analysis may include hierarchical clustering whereby observations or unclassified cluster data entries that belong to a child cluster also belong to a parent cluster.

With continued reference to FIG. 1, flight controller 104 may generate a k-means clustering algorithm receiving unclassified images and outputs a definite number of classified data entry clusters wherein the data entry clusters each contain cluster data entries. K-means algorithm may select a specific number of groups or clusters to output, identified by a variable "k." Generating a k-means clustering algorithm includes assigning inputs containing unclassified data to a "k-group" or "k-cluster" based on feature similarity. Centroids of k-groups or k-clusters may be utilized to generate classified data entry cluster. K-means clustering algorithm may select and/or be provided "k" variable by calculating k-means clustering algorithm for a range of k values and comparing results. K-means clustering algorithm may compare results across different values of k as the mean distance between cluster data entries and cluster centroid. K-means clustering algorithm may calculate mean distance to a centroid as a function of k value, and the location of where the rate of decrease starts to sharply shift, this may be utilized to select a k value. Centroids of k-groups or k-cluster include a collection of feature values which are utilized to classify data entry clusters containing cluster data entries. K-means clustering algorithm may act to identify clusters of closely related pixels, which may be provided with distances; this may, for instance, generate an initial set of air positions from an initial set of images and/or distances, and may also, upon subsequent iterations, identify new clusters to be provided new air positions, to which additional sensor data and/or topographical data may be classified, or to which previously used sensor data and/or topographical data may be reclassified.

With continued reference to FIG. 1, generating a k-means clustering algorithm may include generating initial estimates for k centroids which may be randomly generated or randomly selected from unclassified data input. K centroids may be utilized to define one or more clusters. K-means clustering algorithm may assign unclassified data to one or more k-centroids based on the squared Euclidean distance by first performing a data assigned step of unclassified data. K-means clustering algorithm may assign unclassified data to its nearest centroid based on the collection of centroids ci of centroids in set C. Unclassified data may be assigned to a cluster based on $\text{argmin}_{c_i \ni c} \text{dist}(c_i,x)^2$, where argmin includes argument of the minimum, ci includes a collection of centroids in a set C, and dist includes standard Euclidean distance. K-means clustering module may then recompute centroids by taking mean of all cluster data entries assigned to a centroid's cluster. This may be calculated based on $c_i = 1/|S_i| \Sigma x_i \ni \notin S_i^{vi}$. K-means clustering algorithm may continue to repeat these calculations until a stopping criterion has been satisfied such as when cluster data entries do not change clusters, the sum of the distances have been minimized, and/or some maximum number of iterations has been reached.

Still referring to FIG. 1, k-means clustering algorithm may be configured to calculate a degree of similarity index value. A "degree of similarity index value" as used in this disclosure, includes a distance measurement indicating a measurement between each data entry cluster generated by k-means clustering algorithm and a selected physiological data set. Degree of similarity index value may indicate how close a particular combination of sensor data and/or topographical data is to being classified by k-means algorithm to a particular cluster. K-means clustering algorithm may evaluate the distances of the combination of sensor data and/or topographical data to the k-number of clusters output by k-means clustering algorithm. Short distances between a set of sensor data and/or topographical data and a cluster may indicate a higher degree of similarity between the set of sensor data and/or topographical data and a particular cluster. Longer distances between a set of sensor data and/or topographical data and a cluster may indicate a lower degree of similarity between a sensor data and/or topographical data and a particular cluster.

With continued reference to FIG. 1, k-means clustering algorithm selects a classified data entry cluster as a function of the degree of similarity index value. In an embodiment, k-means clustering algorithm may select a classified data entry cluster with the smallest degree of similarity index value indicating a high degree of similarity between a sensor data and/or topographical data and the data entry cluster. Alternatively or additionally k-means clustering algorithm may select a plurality of clusters having low degree of similarity index values to sensor data and/or topographical data, indicative of greater degrees of similarity. Degree of similarity index values may be compared to a threshold number indicating a minimal degree of relatedness suitable for inclusion of a set of sensor data and/or topographical data in a cluster, where degree of similarity indices a-n falling under the threshold number may be included as indicative of high degrees of relatedness. The above-described illustration of feature learning using k-means clustering is included for illustrative purposes only and should not be construed as limiting potential implementation of feature learning algorithms; persons skilled in the art, upon reviewing the entirety of this disclosure, will be aware of various additional or alternative feature learning approaches that may be used consistently with this disclosure.

Still referring to FIG. 1, similarity function 124 may include a classifier. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. For example, and without limitation, classifier may match the topographical data to known features. A classifier may be configured to output at least a datum that labels or otherwise identifies a set of data that are clustered together, found to be close under a distance metric as described below, or the like. Flight controller 104 and/or another device may generate a classifier using a classification algorithm, defined as a processes whereby a flight controller 104 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, image classifiers, and/or neural network-based classifiers.

Still referring to FIG. 1, flight controller 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where P(AB) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Flight controller 104 may then calculate a likelihood table by calculating probabilities of different data entries and classification labels. Flight controller 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, flight controller 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\Sigma_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

In an embodiment, and still referring to FIG. 1, air position 112 may be identified as a function of obtaining a first image as a function of image capture sensor, wherein an "image" is a visual representation of a physical object and/or structure. In an embodiment, and without limitation, first image may be one or more images and/or visual representations from ground database that may be compared with an image captured by image capture sensor, wherein the first image from the ground feature database is taken from a first known position. Air position 112 may be identified as a function of receiving a second image as a function of image capture sensor. In an embodiment, and without limitation, second image may be one or more images and/or visual representations from ground database that may be compared with the image captured by image capture sensor, wherein the second image from the ground feature database is taken from a second known position. In an embodiment, and without limitation, air position 112 may be identified as a function of first image and second image using a comparator with an image captured by the downward facing sensor are compared, wherein the image from the ground feature database is taken from a known position. As used in this disclosure a "comparator" is a function and/or algorithm that identifies pixels and/or areas in the two images and matches them to each other. In an embodiment, and without limitation, comparator may identify high contrast pixels and/or areas in first image and match them up with a counterpart high contrast area in second image. In an embodiment, and without limitation, comparator may identify a shift and/or difference in the positions from which first image and/or second image was captured. As the position from which the reference and/or database image was taken is known, the shift may be applied to the known position of the reference and/or database image in order to obtain air position 112. In an embodiment, and without limitation, comparator may output a confidence value that may represent the confidence level of the comparison process and/or decision about the shift and/or difference in the images, wherein the confidence value may include an error value. In an embodiment, and without limitation, comparator with a reduced error value and/or greater confidence value may be selected to identify air position 112. Additionally or alternatively, comparator with a higher error value and/or lower confidence value may be discarded and/or removed as a function of exceeding a difference threshold.

Still referring to FIG. 1, identifying air position 112 may include receiving a position training set. As used in this disclosure a "position training set" is training data that correlates sensor datum and/or topographical datum to an air position. For example, and without limitation, sensor datum of a distance of 1000 m from the ground and topographical datum denoting a skyscraper entering the airspace at 200 m may denote to an air position of 800 above a physical object. Position training data may be received as a function of user-entered valuations of sensor data, topographical data, and/or air positions. Flight controller 104 may receive position training data by receiving correlations of sensor data and/or topographical data to an air position that were previously received and/or determined during a previous iteration of identifying air position. Position training data may be received by one or more remote devices and/or FPGAs that at least correlate a sensor datum, and/or topographical datum to an air position. Position training data may be received in the form of one or more user-entered correlations of a sensor datum and/or topographical datum to an air position.

In an embodiment, and still referring to FIG. 1, flight controller 104 may identify air position 112 as a function of a position machine-learning model, wherein a position machine-learning model is trained as a function of position training set. As used in this disclosure a "position machine-learning model" is a machine-learning model to produce an air position output given sensor data and/or topographical data as inputs; this is in contrast to a non-machine learning software program where the commands to be executed are determined in advance by a user and written in a programming language. Position machine-learning model may include one or more position machine-learning processes such as supervised, unsupervised, or reinforcement machine-learning processes that flight controller 104 and/or a remote device may or may not use in the generation of air position, wherein a remote device is described below in detail. Additionally or alternatively, position machine-learning model may include one or more position machine-learning processes that a field-programmable gate array (FPGA) may or may not use in the identification of air position 112. Position machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 1, flight controller 104 may receive position machine-learning model from a remote device and/or FPGA that utilizes one or more position machine learning processes, wherein a remote device and an FPGA is described below in detail. For example, and without limitation, a remote device may include a computing device, external device, processor, FPGA, microprocessor and the like thereof. Remote device and/or FPGA may perform the position machine-learning process using position training data to identify air position 112 and transmit the output to flight controller 104. Remote device and/or FPGA may transmit a signal, bit, datum, or parameter to flight controller 104 that relates to air position. Additionally or alternatively, the remote device and/or FPGA may provide an updated machine-learning model. For example, and without limitation, an updated machine-learning model may be comprised of a firmware update, a software update, a position machine-learning process correction, and the like thereof. As a non-limiting example a software update may incorporate a new topographical datum that relates to a modified sensor datum. Additionally or alternatively, the updated machine learning model may be transmitted to the remote device and/or FPGA, wherein the remote device and/or FPGA may replace the position machine-learning model with the updated machine-learning model and identify air position as a function of the sensor data and/or topographical data, using the updated machine-learning model. The updated machine-learning model may be transmitted by the remote device and/or FPGA and received by flight controller 104 as a software update, firmware update, or corrected habit machine-learning model. For example, and without limitation position machine learning model may utilize a neural net machine-learning process, wherein the updated machine-learning model may incorporate a gradient boosting machine-learning process.

Still referring to FIG. 1, position machine-learning model may include a classifier. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Flight controller 104 and/or another device may generate a classifier using a classification algorithm, defined as a processes whereby a flight controller 104 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, image classifiers, and/or neural network-based classifiers.

Still referring to FIG. 1, flight controller 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where P(AB) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Flight controller 104 may then calculate a likelihood table by calculating probabilities of different data entries and classification labels. Flight controller 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, flight controller 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein.

As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\sum_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 1, flight controller 104 is configured to determine a command as a function of air position 112. As used in this disclosure a "command" is a direction and/or guidance to perform an action and/or motion. In an embodiment, and without limitation, determining command 128 may include identifying a flight component, wherein a flight component is a portion of an aircraft that can be moved or adjusted to affect one or more flight elements as described below in detail in reference to FIG. 3. For example, flight component may include a component used to affect the aircrafts' roll and pitch which may comprise one or more ailerons. As a further example, flight component may include a rudder to control yaw of an aircraft. In an embodiment, and without limitation command 128 may include an actuator command. As used in this disclosure an "actuator command" is a direction and/or instruction given to an actuator to move and/or shift a flight component. As used in this disclosure an "actuator" is a motor that may adjust an angle, position, and/or rotation of flight component. For example, and without limitation an actuator may adjust rotor 4° in the horizontal axis. As a further non, limiting example, an actuator may adjust an a propulsor from a first vertically aligned angle to a second vertically aligned angle. For example, flight component may be attached at a first vertical axis, wherein the first vertical axis may include a 3° inward and/or 1.4° forward wherein an actuator may maneuver and/or shift flight component 116+/−15° in the horizontal and/or longitudinal axis. In an embodiment, and without limitation, actuator command may direct an actuator to may adjust a propulsor 4° in the horizontal axis. As a further non, limiting example, actuator command may direct an actuator to may adjust an aileron 2° in the vertical axis. As a further non-limiting example, actuator command may direct a flight component with a first vertical axis, wherein the first vertical axis may include a 2.2° inward and/or 2.7° forward, to maneuver and/or shift the flight component+/−15° in the horizontal and/or longitudinal axis. Additionally or alternatively, command 128 may include a thrust command. As used in this disclosure a "thrust command" is a direction and/or instruction given to a flight component that produces thrust. For example, and without limitation, thrust command may instruct a propulsor to reduce a first thrust of 8,000 N to a second thrust of 2,000 N. As a further non-limiting example, thrust command may instruct a propulsor to increase an airspeed from a first airspeed of 230 km/h to a second airspeed of 402 km/h. In an embodiment, and without limitation, determining command 128 may include identifying a desired torque for flight component. As used in this disclosure a "desired torque" is a measurable value of force exerted on the flight component that is expected and/or desired. For example, and without limitation, desired torque may denote an expectation for a propeller of 160 lb. ft. of torque. As a further non-limiting example, desired torque may denote an expectation for a propulsor be 290 lb. ft. of torque.

In an embodiment, and still referring to FIG. 1, flight controller 104 may determine command 128 as a function of training a command machine-learning model. As used in this disclosure a "command machine-learning model" is a machine-learning model to produce a command output given air position as an input; this is in contrast to a non-machine learning software program where the commands to be executed are determined in advance by a user and written in a programming language. Command machine-learning model may include one or more command machine-learning processes such as supervised, unsupervised, or reinforcement machine-learning processes that flight controller 104 and/or a remote device may or may not use in the generation of command. As used in this disclosure "remote device" is an external device to flight controller 104. Additionally or alternatively, command machine-learning model may include one or more command machine-learning processes that a field-programmable gate array (FPGA) may or may not use in the generation of command. Command machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 1, command machine learning model may be trained as a function of command training data, wherein command training data may correlate a plurality of air positions to a plurality of flight maneuvers to a command. As used in this disclosure a "flight maneuver" is an aircraft action and/or maneuver that alters one or more elements of a flight. For example, and without limitation, flight maneuver may include taxiing, takeoff, landing, stability control maneuvers, hovering, emergency response maneuvers, regulation of altitude, roll, pitch, yaw, speed, acceleration, or the like during any phase of flight. A flight maneuver may further include a flight plan or sequence of maneuvers to be performed during a flight plan. A flight maneuver can also include a change in altitude, change in speed, changed in travel direction, or the like. Further, a flight maneuver may include a landing, which may be a runway landing, defined herein as a landing in which a fixed-wing aircraft, or other aircraft that generates lift by moving a foil forward through air, flies forward toward a flat area of ground or water, alighting on the flat area and then moving forward until momentum is exhausted on wheels or (in the case of landing on water) pontoons. Momentum may be exhausted more rapidly by reverse thrust using propulsors, mechanical braking, electric braking, or the like. In an embodiment, a flight maneuver may include a vertical landing protocol, which may include a rotor-based landing such as one performed by rotorcraft such as helicopters or the like. In an embodiment, vertical takeoff and landing protocols may require greater expenditure of energy than runway-based landings. For example, vertical takeoff and landing protocols may, for instance, require substantial expenditure of energy to maintain a hover or near hover while descending or ascending, while the latter may require a net decrease in energy to approach or achieve stall. For example, and without limitation, an air position of 100 m above a mountain range and a flight maneuver of increasing altitude may result in a command that includes an actuator command to maneuver and/or shift a propulsor 4° in the horizontal axis. Command training data may be received as a function of user-entered valuations of air positions, flight maneuvers, and/or commands. Flight controller 104 may receive command training data by receiving correlations of air positions and/or flight maneuvers to commands that were previously received and/or determined during a previous iteration of generation of command 128. Command training data may be received by one or more remote devices and/or FPGAs that at least correlate a/an air position and/or flight maneuver to a command. Command training data may be received in the form of one or more user-entered correlations of a/an air position and/or flight maneuver to a command.

Still referring to FIG. 1, flight controller 104 may receive command machine-learning model from a remote device and/or FPGA that utilizes one or more command machine learning processes, wherein a remote device and an FPGA is described above in detail. For example, and without limitation, a remote device may include a computing device, external device, processor, FPGA, microprocessor and the like thereof. Remote device and/or FPGA may perform the command machine-learning process using command training data to generate command and transmit the output to flight controller 104. Remote device and/or FPGA may transmit a signal, bit, datum, or parameter to flight controller 104 that at least relates to command. Additionally or alternatively, the remote device and/or FPGA may provide an updated machine-learning model. For example, and without limitation, an updated machine-learning model may be comprised of a firmware update, a software update, a command machine-learning process correction, and the like thereof. As a non-limiting example a software update may incorporate a new sensor datum that relates to a modified flight maneuver. Additionally or alternatively, the updated machine learning model may be transmitted to the remote device and/or FPGA, wherein the remote device and/or FPGA may replace the command machine-learning model with the updated machine-learning model and generate the command as a function of the model, simulation data, and/or operational data using the updated machine-learning model. The updated machine-learning model may be transmitted by the remote device and/or FPGA and received by flight controller 104 as a software update, firmware update, or corrected command machine-learning model. For example, and without limitation command machine learning model may utilize a neural net machine-learning process, wherein the updated machine-learning model may incorporate a gradient boosting machine-learning process. Machine-learning model may be transmitted, without limitation, in the form of a software update, a firmware update, and/or a bitstream reconfiguring an FPGA or similar device; machine-learning model may be transmitted in the form of coefficients, weights, and/or other parameters that have been tuned as part of a machine-learning process as described in further detail below.

Still referring to FIG. 1, flight controller 104 is configured to initiate command 128 initiates command 128. In an embodiment, and without limitation, initiating command 128 may include transmitting one or more signals and/or controls to flight component, wherein a flight component is described below in detail, in reference to FIG. 2. In an embodiment, and without limitation, initiating command 128 may be performed autonomously and/or without a pilot interaction. For example, and without limitation, flight controller 104 may determine command 128 and autonomously maneuver and/or shift flight component. In an embodiment, and without limitation, initiating command 128 may include transmitting a notification to a pilot and obtaining a pilot signal as a function of the notification, wherein a pilot signal is described in detail below, in reference to FIG. 3. In an embodiment, and without limitation, notification may include a signal and/or display to a user such as, but not limited to a pilot, wherein the signal and/or display depicts air position 112 of eVTOL aircraft. In an embodiment, and without limitation, notification may be transmitted as a function of a notification unit. As used in this disclosure a "notification unit" is a component capable of producing and/or emitting a notification and/or signal to a pilot. In an embodiment, and without limitation, notification unit may include a graphical user interface (GUI). For the purposes of this disclosure, a "graphical user interface" is a device configured to present data or information in a visual manner to a pilot, computer, camera or combination thereof. Notification unit may be configured to display information regarding eVTOL aircraft. Notification unit may be configured to display information regarding a failure of a flight component and/or a failure of an energy source. Notification unit may prompt a pilot to input a pilot signal as a function of a required interaction and/or response. Notification unit may be configured to receive haptic, audio, visual, gesture, passkey, or other type of interaction from the pilot. Notification unit may perform one or more functions in response to the interaction from the pilot. In non-limiting examples, and without limitation, notification unit may transmit a pilot signal to flight controller 104 when an affirmative interaction is received from the pilot, the signal indicating to transmit one or more signals to other components communicatively connected thereto, such as flight component. Notification unit may operate independently from flight controller 104 and any other component communicatively connected thereto. For example and without limitation, notification unit may indicate to the pilot that an energy source has a certain level of charge and eVTOL aircraft may operate autonomously to adjust one or more electrical commands regardless of the notification to the pilot. Flight controller 104 may commend flight component to initiate command 128 as a function of the pilot signal.

Figure 2:
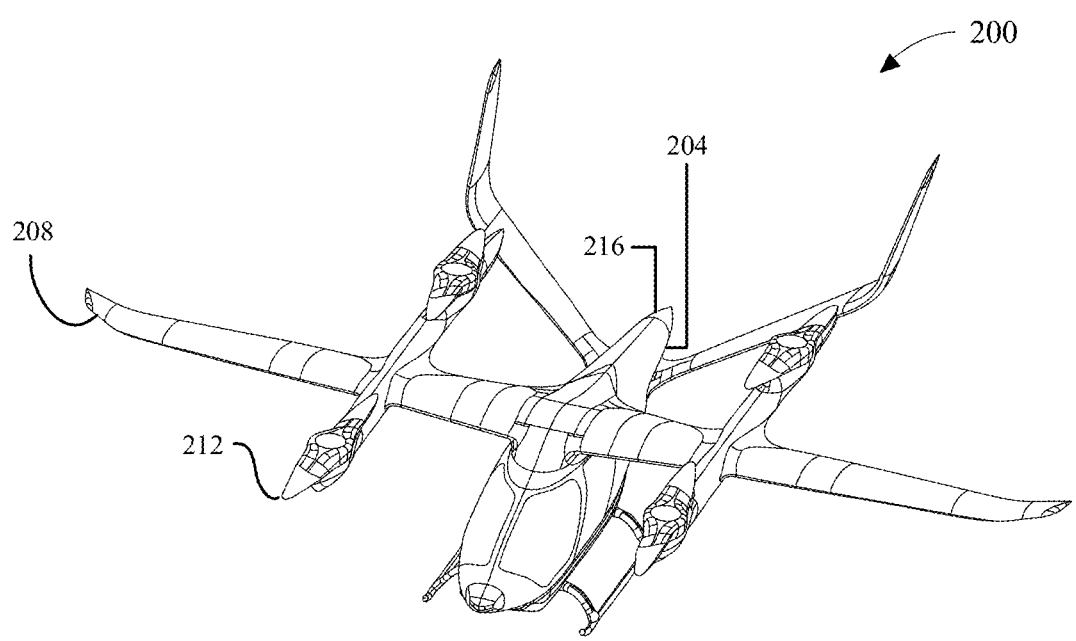
FIG. 2 is a diagrammatic representation of an exemplary embodiment of an eVTOL aircraft.

Now referring to FIG. 2, an eVTOL aircraft 200 is illustrated. eVTOL aircraft 200 may include any eVTOL aircraft as described above, in reference to FIG. 1. eVTOL aircraft may include a fuselage 204. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 204 may comprise structural elements that physically support the shape and structure of an aircraft. Structural elements may take a plurality of forms, alone or in combination with other types. Structural elements may vary depending on the construction type of aircraft and specifically, the fuselage. Fuselage 204 may comprise a truss structure. A truss structure is often used with a lightweight aircraft and comprises welded steel tube trusses. A truss, as used herein, is an assembly of beams that create a rigid structure, often in combinations of triangles to create three-dimensional shapes. A truss structure may alternatively comprise wood construction in place of steel tubes, or a combination thereof. In embodiments, structural elements may comprise steel tubes and/or wood beams. In an embodiment, and without limitation, structural elements may include an aircraft skin. Aircraft skin may be layered over the body shape constructed by trusses. Aircraft skin may comprise a plurality of materials such as plywood sheets, aluminum, fiberglass, and/or carbon fiber, the latter of which will be addressed in greater detail later in this paper.

In embodiments, fuselage 204 may comprise geodesic construction. Geodesic structural elements may include stringers wound about formers (which may be alternatively called station frames) in opposing spiral directions. A stringer, as used herein, is a general structural element that comprises a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along the length of the interior of fuselage 204 orthogonal to the longitudinal (nose to tail) axis of the aircraft and forms the general shape of fuselage 204. A former may comprise differing cross-sectional shapes at differing locations along fuselage 204, as the former is the structural element that informs the overall shape of a fuselage 204 curvature. In embodiments, aircraft skin can be anchored to formers and strings such that the outer mold line of the volume encapsulated by the formers and stringers comprises the same shape as eVTOL aircraft 200 when installed. In other words, former(s) may form a fuselage's ribs, and the stringers may form the interstitials between such ribs. The spiral orientation of stringers about formers provides uniform robustness at any point on an aircraft fuselage such that if a portion sustains damage, another portion may remain largely unaffected. Aircraft skin would be mechanically coupled to underlying stringers and formers and may interact with a fluid, such as air, to generate lift and perform maneuvers.

In an embodiment, and still referring to FIG. 2, fuselage 204 may comprise monocoque construction. Monocoque construction may include a primary structure that forms a shell (or skin in an aircraft's case) and supports physical loads. Monocoque fuselages are fuselages in which the aircraft skin or shell is also the primary structure. In monocoque construction aircraft skin would support tensile and compressive loads within itself and true monocoque aircraft can be further characterized by the absence of internal structural elements. Aircraft skin in this construction method is rigid and can sustain its shape with no structural assistance form underlying skeleton-like elements. Monocoque fuselage may comprise aircraft skin made from plywood layered in varying grain directions, epoxy-impregnated fiberglass, carbon fiber, or any combination thereof.

According to embodiments, fuselage 204 may include a semi-monocoque construction. Semi-monocoque construction, as used herein, is a partial monocoque construction, wherein a monocoque construction is describe above detail. In semi-monocoque construction, fuselage 204 may derive some structural support from stressed aircraft skin and some structural support from underlying frame structure made of structural elements. Formers or station frames can be seen running transverse to the long axis of fuselage 204 with circular cutouts which are generally used in real-world manufacturing for weight savings and for the routing of electrical harnesses and other modern on-board systems. In a semi-monocoque construction, stringers are the thin, long strips of material that run parallel to fuselage's long axis. Stringers may be mechanically coupled to formers permanently, such as with rivets. Aircraft skin may be mechanically coupled to stringers and formers permanently, such as by rivets as well. A person of ordinary skill in the art will appreciate that there are numerous methods for mechanical fastening of the aforementioned components like crews, nails, dowels, pins, anchors, adhesives like glue or epoxy, or bolts and nuts, to name a few. A subset of fuselage under the umbrella of semi-monocoque construction is unibody vehicles. Unibody, which is short for "unitized body" or alternatively "unitary construction", vehicles are characterized by a construction in which the body, floor plan, and chassis form a single structure. In the aircraft world, unibody would comprise the internal structural elements like formers and stringers are constructed in one piece, integral to the aircraft skin as well as any floor construction like a deck.

Still referring to FIG. 2, stringers and formers which account for the bulk of any aircraft structure excluding monocoque construction can be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin will be transferred to stringers. The location of said stringers greatly informs the type of forces and loads applied to each and every stringer, all of which may be handled by material selection, cross-sectional area, and mechanical coupling methods of each member. The same assessment may be made for formers. In general, formers are significantly larger in cross-sectional area and thickness, depending on location, than stringers. Both stringers and formers may comprise aluminum, aluminum alloys, graphite epoxy composite, steel alloys, titanium, or an undisclosed material alone or in combination.

In an embodiment, and still referring to FIG. 2, stressed skin, when used in semi-monocoque construction is the concept where the skin of an aircraft bears partial, yet significant, load in the overall structural hierarchy. In other words, the internal structure, whether it be a frame of welded tubes, formers and stringers, or some combination, is not sufficiently strong enough by design to bear all loads. The concept of stressed skin is applied in monocoque and semi-monocoque construction methods of fuselage 204. Monocoque comprises only structural skin, and in that sense, aircraft skin undergoes stress by applied aerodynamic fluids imparted by the fluid. Stress as used in continuum mechanics can be described in pound-force per square inch ($lbf/in^2$) or Pascals (Pa). In semi-monocoque construction stressed skin bears part of the aerodynamic loads and additionally imparts force on the underlying structure of stringers and formers.

Still referring to FIG. 2, it should be noted that an illustrative embodiment is presented only, and this disclosure in no way limits the form or construction of eVTOL aircraft 200. In embodiments, fuselage 204 may be configurable based on the needs of the eVTOL per specific mission or objective. The general arrangement of components, structural elements, and hardware associated with storing and/or moving a payload may be added or removed from fuselage 204 as needed, whether it is stowed manually, automatedly, or removed by personnel altogether. Fuselage 204 may be configurable for a plurality of storage options. Bulkheads and dividers may be installed and uninstalled as needed, as well as longitudinal dividers where necessary. Bulkheads and dividers may be installed using integrated slots and hooks, tabs, boss and channel, or hardware like bolts, nuts, screws, nails, clips, pins, and/or dowels, to name a few. Fuselage 204 may also be configurable to accept certain specific cargo containers, or a receptacle that can, in turn, accept certain cargo containers.

Still referring to FIG. 2, eVTOL aircraft 200 may include a plurality of laterally extending elements 208 attached to fuselage 204. As used in this disclosure a "laterally extending element" is an element that projects essentially horizontally from fuselage, including an outrigger, a spar, and/or a fixed wing that extends from fuselage. Wings may be structures which include airfoils configured to create a pressure differential resulting in lift. Wings may generally dispose on the left and right sides of the aircraft symmetrically, at a point between nose and empennage. Wings may comprise a plurality of geometries in planform view, swept swing, tapered, variable wing, triangular, oblong, elliptical, square, among others. A wing's cross section may geometry comprises an airfoil. An "airfoil" as used in this disclosure is a shape specifically designed such that a fluid flowing above and below it exert differing levels of pressure against the top and bottom surface. In embodiments, the bottom surface of an aircraft can be configured to generate a greater pressure than does the top, resulting in lift. In an embodiment, and without limitation, wing may include a leading edge. As used in this disclosure a "leading edge" is a foremost edge of an airfoil that first intersects with the external medium. For example, and without limitation, leading edge may include one or more edges that may comprise one or more characteristics such as sweep, radius and/or stagnation point, droop, thermal effects, and the like thereof. In an embodiment, and without limitation, wing may include a trailing edge. As used in this disclosure a "trailing edge" is a rear edge of an airfoil. In an embodiment, and without limitation, trailing edge may include an edge capable of controlling the direction of the departing medium from the wing, such that a controlling force is exerted on the aircraft. Laterally extending element 208 may comprise differing and/or similar cross-sectional geometries over its cord length or the length from wing tip to where wing meets the aircraft's body. One or more wings may be symmetrical about the aircraft's longitudinal plane, which comprises the longitudinal or roll axis reaching down the center of the aircraft through the nose and empennage, and the plane's yaw axis. Laterally extending element may comprise controls surfaces configured to be commanded by a pilot or pilots to change a wing's geometry and therefore its interaction with a fluid medium, like air. Control surfaces may comprise flaps, ailerons, tabs, spoilers, and slats, among others. The control surfaces may dispose on the wings in a plurality of locations and arrangements and in embodiments may be disposed at the leading and trailing edges of the wings, and may be configured to deflect up, down, forward, aft, or a combination thereof. An aircraft, including a dual-mode aircraft may comprise a combination of control surfaces to perform maneuvers while flying or on ground.

Still referring to FIG. 2, eVTOL aircraft 200 may include a plurality of lift components 212 attached to the plurality of extending elements 208. As used in this disclosure a "lift component" is a component and/or device used to propel a craft upward by exerting downward force on a fluid medium, which may include a gaseous medium such as air or a liquid medium such as water. Lift component 212 may include any device or component that consumes electrical power on demand to propel an electric aircraft in a direction or other vehicle while on ground or in-flight. For example, and without limitation, lift component 212 may include a rotor, propeller, paddle wheel and the like thereof, wherein a rotor is a component that produces torque along a longitudinal axis, and a propeller produces torquer along a vertical axis. In an embodiment, lift component 212 may include a propulsor. In an embodiment, when a propulsor twists and pulls air behind it, it will, at the same time, push an aircraft forward with an equal amount of force. As a further non-limiting example, lift component 212 may include a thrust element which may be integrated into the propulsor. The thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like. The more air pulled behind an aircraft, the greater the force with which the aircraft is pushed forward.

In an embodiment, and still referring to FIG. 2, lift component 212 may include a plurality of blades. As used in this disclosure a "blade" is a propeller that converts rotary motion from an engine or other power source into a swirling slipstream. In an embodiment, blade may convert rotary motion to push the propeller forwards or backwards. In an embodiment lift component 212 may include a rotating power-driven hub, to which are attached several radial airfoil-section blades such that the whole assembly rotates about a longitudinal axis. The blades may be configured at an angle of attack. In an embodiment, and without limitation, angle of attack may include a fixed angle of attack. As used in this disclosure an "fixed angle of attack" is fixed angle between the chord line of the blade and the relative wind. As used in this disclosure a "fixed angle" is an angle that is secured and/or unmovable from the attachment point. For example, and without limitation fixed angle of attack may be 2.8° as a function of a pitch angle of 8.1° and a relative wind angle 5.3°. In another embodiment, and without limitation, angle of attack may include a variable angle of attack. As used in this disclosure a "variable angle of attack" is a variable and/or moveable angle between the chord line of the blade and the relative wind. As used in this disclosure a "variable angle" is an angle that is moveable from the attachment point. For example, and without limitation variable angle of attack may be a first angle of 4.7° as a function of a pitch angle of 7.1° and a relative wind angle 2.4°, wherein the angle adjusts and/or shifts to a second angle of 2.7° as a function of a pitch angle of 5.1° and a relative wind angle 2.4°. In an embodiment, angle of attack be configured to produce a fixed pitch angle. As used in this disclosure a "fixed pitch angle" is a fixed angle between a cord line of a blade and the rotational velocity direction. For example, and without limitation, fixed pitch angle may include 18°. In another embodiment fixed angle of attack may be manually variable to a few set positions to adjust one or more lifts of the aircraft prior to flight. In an embodiment, blades for an aircraft are designed to be fixed to their hub at an angle similar to the thread on a screw makes an angle to the shaft; this angle may be referred to as a pitch or pitch angle which will determine the speed of the forward movement as the blade rotates.

In an embodiment, and still referring to FIG. 2, lift component 212 may be configured to produce a lift. As used in this disclosure a "lift" is a perpendicular force to the oncoming flow direction of fluid surrounding the surface. For example, and without limitation relative air speed may be horizontal to eVTOL aircraft 200, wherein the lift force may be a force exerted in the vertical direction, directing eVTOL aircraft 200 upwards. In an embodiment, and without limitation, lift component 212 may produce lift as a function of applying a torque to lift component. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. In an embodiment, and without limitation, lift component 212 may receive a source of power and/or energy from a power sources may apply a torque on lift component 212 to produce lift. As used in this disclosure a "power source" is a source that that drives and/or controls any component attached to eVTOL aircraft 200. For example, and without limitation power source may include a motor that operates to move one or more lift components, to drive one or more blades, or the like thereof. A motor may be driven by direct current (DC) electric power and may include, without limitation, brushless DC electric motors, switched reluctance motors, induction motors, or any combination thereof. A motor may also include electronic speed controllers or other components for regulating motor speed, rotation direction, and/or dynamic braking.

Still referring to FIG. 2, power source may include an energy source. An energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which eVTOL aircraft 200 may be incorporated.

In an embodiment, and still referring to FIG. 2, an energy source may be used to provide a steady supply of electrical power to a load over the course of a flight by a vehicle or other electric aircraft. For example, the energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, the energy source may be capable of providing sufficient electrical power for auxiliary loads including without limitation, lighting, navigation, communications, de-icing, steering or other systems requiring power or energy. Further, the energy source may be capable of providing sufficient power for controlled descent and landing protocols, including, without limitation, hovering descent or runway landing. As used herein the energy source may have high power density where the electrical power an energy source can usefully produce per unit of volume and/or mass is relatively high. The electrical power is defined as the rate of electrical energy per unit time. An energy source may include a device for which power that may be produced per unit of volume and/or mass has been optimized, at the expense of the maximal total specific energy density or power capacity, during design. Non-limiting examples of items that may be used as at least an energy source may include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 2, an energy source may include a plurality of energy sources, referred to herein as a module of energy sources. The module may include batteries connected in parallel or in series or a plurality of modules connected either in series or in parallel designed to deliver both the power and energy requirements of the application. Connecting batteries in series may increase the voltage of at least an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of at least an energy source may be based on the individual battery cell performance or an extrapolation based on the measurement of at least an electrical parameter. In an embodiment where the energy source includes a plurality of battery cells, the overall power output capacity may be dependent on the electrical parameters of each individual cell. If one cell experiences high self-discharge during demand, power drawn from at least an energy source may be decreased to avoid damage to the weakest cell. The energy source may further include, without limitation, wiring, conduit, housing, cooling system and battery management system. Persons skilled in the art will be aware, after reviewing the entirety of this disclosure, of many different components of an energy source.

Still referring to FIG. 2, eVTOL aircraft 200 may include at least a longitudinal thrust component 216. As used in this disclosure a "longitudinal thrust component" is a flight component that is mounted such that the component thrusts the flight component through a medium. As a non-limiting example, longitudinal thrust flight component 216 may include a pusher flight component such as a pusher propeller, a pusher motor, a pusher propulsor, and the like. Additionally, or alternatively, pusher flight component may include a plurality of pusher flight components. As a further non-limiting example, longitudinal thrust flight component may include a puller flight component such as a puller propeller, a puller motor, a puller propulsor, and the like. Additionally, or alternatively, puller flight component may include a plurality of puller flight components.

Figure 3:
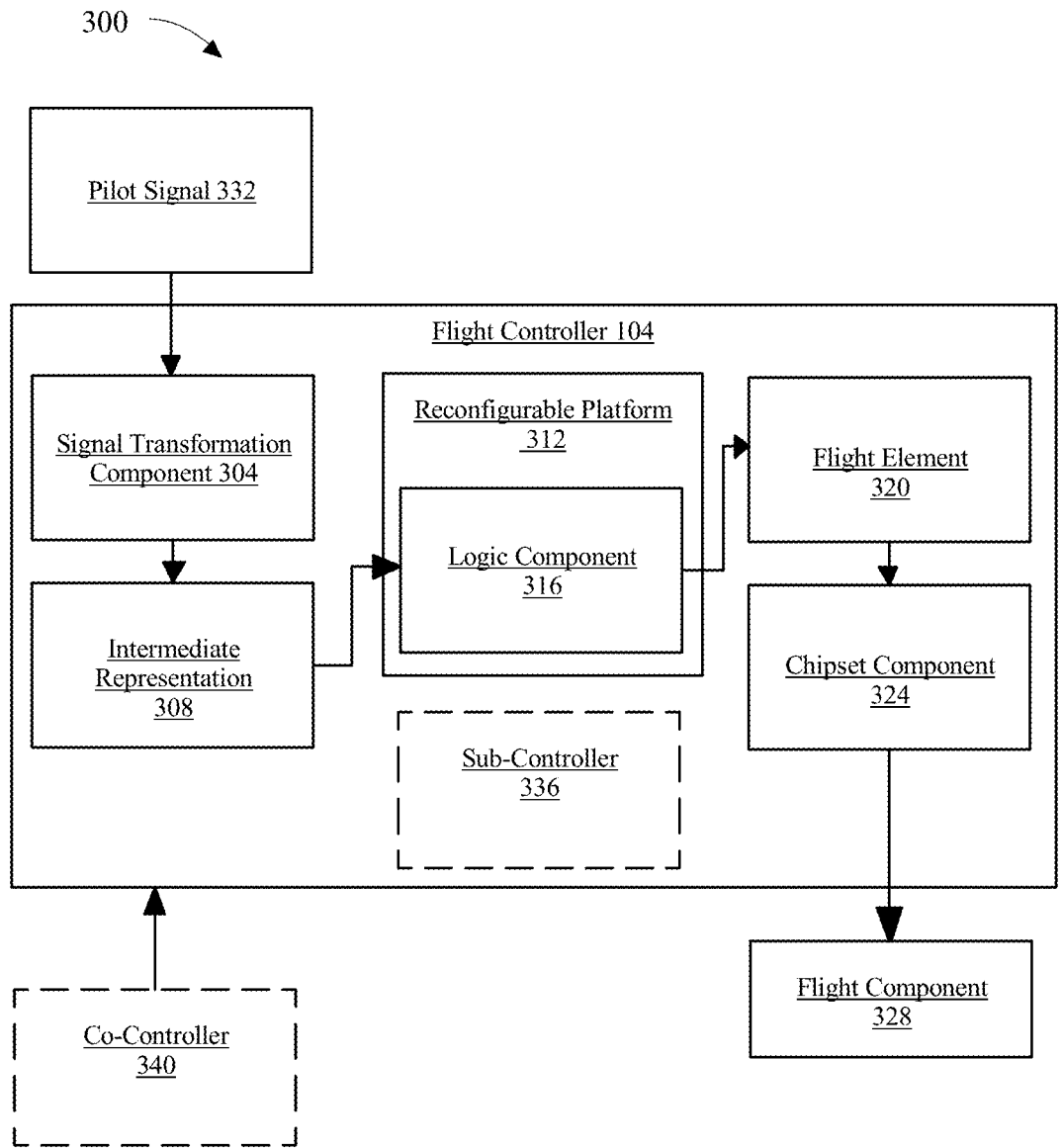
FIG. 3 is a block diagram of an exemplary embodiment of a flight controller.

Now referring to FIG. 3, an exemplary embodiment 300 of a flight controller 104 is illustrated, wherein a flight controller is a computing device of a plurality of computing devices dedicated to data storage, security, distribution of traffic for load balancing, and flight instruction as described above, in reference to FIGS. 1-2. Flight controller 104 may include and/or communicate with any computing device as described in this disclosure, including without limitation a microcontroller, microprocessor, digital signal processor (DSP) and/or system on a chip (SoC) as described in this disclosure. Further, flight controller 104 may include a single computing device operating independently, or may include two or more computing device operating in concert, in parallel, sequentially or the like; two or more computing devices may be included together in a single computing device or in two or more computing devices. In embodiments, flight controller 104 may be installed in an aircraft, may control the aircraft remotely, and/or may include an element installed in the aircraft and a remote element in communication therewith.

In an embodiment, and still referring to FIG. 3, flight controller 104 may include a signal transformation component 304. As used in this disclosure a "signal transformation component" is a component that transforms and/or converts a first signal to a second signal, wherein a signal may include one or more digital and/or analog signals. For example, and without limitation, signal transformation component 304 may be configured to perform one or more operations such as preprocessing, lexical analysis, parsing, semantic analysis, and the like thereof. In an embodiment, and without limitation, signal transformation component 304 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 304 may include transforming one or more low-level languages such as, but not limited to, machine languages and/or assembly languages. For example, and without limitation, signal transformation component 304 may include transforming a binary language signal to an assembly language signal. In an embodiment, and without limitation, signal transformation component 304 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 3, signal transformation component 304 may be configured to optimize an intermediate representation 308. As used in this disclosure an "intermediate representation" is a data structure and/or code that represents the input signal. Signal transformation component 304 may optimize intermediate representation as a function of a data-flow analysis, dependence analysis, alias analysis, pointer analysis, escape analysis, and the like thereof. In an embodiment, and without limitation, signal transformation component 304 may optimize intermediate representation 308 as a function of one or more inline expansions, dead code eliminations, constant propagation, loop transformations, and/or automatic parallelization functions. In another embodiment, signal transformation component 304 may optimize intermediate representation as a function of a machine dependent optimization such as a peephole optimization, wherein a peephole optimization may rewrite short sequences of code into more efficient sequences of code. Signal transformation component 304 may optimize intermediate representation to generate an output language, wherein an "output language," as used herein, is the native machine language of flight controller 104. For example, and without limitation, native machine language may include one or more binary and/or numerical languages.

In an embodiment, and without limitation, signal transformation component 304 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 3, flight controller 104 may include a reconfigurable hardware platform 312. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 312 may be reconfigured to enact any algorithm and/or algorithm selection process received from another computing device and/or created using machine-learning processes.

Still referring to FIG. 3, reconfigurable hardware platform 312 may include a logic component 316. As used in this disclosure a "logic component" is a component that executes instructions on output language. For example, and without limitation, logic component may perform basic arithmetic, logic, controlling, input/output operations, and the like thereof. Logic component 316 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 316 may be organized according to Von Neumann and/or Harvard architecture as a non-limiting example. Logic component 316 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 316 may include one or more integrated circuit microprocessors, which may contain one or more central processing units, central processors, and/or main processors, on a single metal-oxide-semiconductor chip. Logic component 316 may be configured to execute a sequence of stored instructions to be performed on the output language and/or intermediate representation 308. Logic component 316 may be configured to fetch and/or retrieve the instruction from a memory cache, wherein a "memory cache," as used in this disclosure, is a stored instruction set on flight controller 104. Logic component 316 may be configured to decode the instruction retrieved from the memory cache to opcodes and/or operands. Logic component 316 may be configured to execute the instruction on intermediate representation 308 and/or output language. For example, and without limitation, logic component 316 may be configured to execute an addition operation on intermediate representation 308 and/or output language.

In an embodiment, and without limitation, logic component 316 may be configured to calculate a flight element 320. As used in this disclosure a "flight element" is an element of datum denoting a relative status of aircraft. For example, and without limitation, flight element 320 may denote one or more torques, thrusts, airspeed velocities, forces, altitudes, groundspeed velocities, directions during flight, directions facing, forces, orientations, and the like thereof. For example, and without limitation, flight element 320 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 320 may denote that aircraft is following a flight path accurately and/or sufficiently.

Still referring to FIG. 3, flight controller 104 may include a chipset component 324. As used in this disclosure a "chipset component" is a component that manages data flow. In an embodiment, and without limitation, chipset component 324 may include a northbridge data flow path, wherein the northbridge dataflow path may manage data flow from logic component 316 to a high-speed device and/or component, such as a RAM, graphics controller, and the like thereof. In another embodiment, and without limitation, chipset component 324 may include a southbridge data flow path, wherein the southbridge dataflow path may manage data flow from logic component 316 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 324 may manage data flow between logic component 316, memory cache, and a flight component 328. As used in this disclosure a "flight component" is a portion of an aircraft that can be moved or adjusted to affect one or more flight elements. For example, flight component 328 may include a component used to affect the aircrafts' roll and pitch which may comprise one or more ailerons. As a further example, flight component 328 may include a rudder to control yaw of an aircraft. In an embodiment, chipset component 324 may be configured to communicate with a plurality of flight components as a function of flight element 320. For example, and without limitation, chipset component 324 may transmit to an aircraft rotor to reduce torque of a first lift propulsor and increase the forward thrust produced by a pusher component to perform a flight maneuver.

In an embodiment, and still referring to FIG. 3, flight controller 104 may be configured generate an autonomous function. As used in this disclosure an "autonomous function" is a mode and/or function of flight controller 104 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 320. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 104 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 104 will control the ailerons and/or rudders. As used in this disclosure "non-autonomous mode" is a mode that denotes a pilot will control aircraft and/or maneuvers of aircraft in its entirety.

In an embodiment, and still referring to FIG. 3, flight controller 104 may generate autonomous function as a function of an autonomous machine-learning model. As used in this disclosure an "autonomous machine-learning model" is a machine-learning model to produce an autonomous function output given flight element 320 and a pilot signal 332 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 332 may denote that a pilot is controlling and/or maneuvering ailerons, wherein the pilot is not in control of the rudders and/or propulsors. In an embodiment, pilot signal 332 may include an implicit signal and/or an explicit signal. For example, and without limitation, pilot signal 332 may include an explicit signal, wherein the pilot explicitly states there is a lack of control and/or desire for autonomous function. As a further non-limiting example, pilot signal 332 may include an explicit signal directing flight controller 104 to control and/or maintain a portion of aircraft, a portion of the flight plan, the entire aircraft, and/or the entire flight plan. As a further non-limiting example, pilot signal 332 may include an implicit signal, wherein flight controller 104 detects a lack of control such as by a malfunction, torque alteration, flight path deviation, and the like thereof. In an embodiment, and without limitation, pilot signal 332 may include one or more explicit signals to reduce torque, and/or one or more implicit signals that torque may be reduced due to reduction of airspeed velocity. In an embodiment, and without limitation, pilot signal 332 may include one or more local and/or global signals. For example, and without limitation, pilot signal 332 may include a local signal that is transmitted by a pilot and/or crew member. As a further non-limiting example, pilot signal 332 may include a global signal that is transmitted by air traffic control and/or one or more remote users that are in communication with the pilot of aircraft. In an embodiment, pilot signal 332 may be received as a function of a tri-state bus and/or multiplexor that denotes an explicit pilot signal should be transmitted prior to any implicit or global pilot signal.

Still referring to FIG. 3, autonomous machine-learning model may include one or more autonomous machine-learning processes such as supervised, unsupervised, or reinforcement machine-learning processes that flight controller 104 and/or a remote device may or may not use in the generation of autonomous function. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 3, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 104 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 3, flight controller 104 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 104. Remote device and/or FPGA may transmit a signal, bit, datum, or parameter to flight controller 104 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 104 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 3, flight controller 104 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 3, flight controller 104 may include, but is not limited to, for example, a cluster of flight controllers in a first location and a second flight controller or cluster of flight controllers in a second location. Flight controller 104 may include one or more flight controllers dedicated to data storage, security, distribution of traffic for load balancing, and the like. Flight controller 104 may be configured to distribute one or more computing tasks as described below across a plurality of flight controllers, which may operate in parallel, in series, redundantly, or in any other manner used for distribution of tasks or memory between computing devices. For example, and without limitation, flight controller 104 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 3, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 328. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 3, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 104. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 308 and/or output language from logic component 316, wherein output language may include one or more analog-to-digital conversions, low bit rate transmissions, message encryptions, digital signals, binary signals, logic signals, analog signals, and the like thereof described above in detail.

Still referring to FIG. 3, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 3, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 3, flight controller 104 may also be implemented using a "shared nothing" architecture in which data is cached at the worker, in an embodiment, this may enable scalability of aircraft and/or computing device. Flight controller 104 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 3, flight controller may include a sub-controller 336. As used in this disclosure a "sub-controller" is a controller and/or component that is part of a distributed controller as described above; for instance, flight controller 104 may be and/or include a distributed flight controller made up of one or more sub-controllers. For example, and without limitation, sub-controller 336 may include any controllers and/or components thereof that are similar to distributed flight controller and/or flight controller as described above. Sub-controller 336 may include any component of any flight controller as described above. Sub-controller 336 may be implemented in any manner suitable for implementation of a flight controller as described above. As a further non-limiting example, sub-controller 336 may include one or more processors, logic components and/or computing devices capable of receiving, processing, and/or transmitting data across the distributed flight controller as described above. As a further non-limiting example, sub-controller 336 may include a controller that receives a signal from a first flight controller and/or first distributed flight controller component and transmits the signal to a plurality of additional sub-controllers and/or flight components.

Still referring to FIG. 3, flight controller may include a co-controller 340. As used in this disclosure a "co-controller" is a controller and/or component that joins flight controller 104 as components and/or nodes of a distributer flight controller as described above. For example, and without limitation, co-controller 340 may include one or more controllers and/or components that are similar to flight controller 104. As a further non-limiting example, co-controller 340 may include any controller and/or component that joins flight controller 104 to distributer flight controller. As a further non-limiting example, co-controller 340 may include one or more processors, logic components and/or computing devices capable of receiving, processing, and/or transmitting data to and/or from flight controller 104 to distributed flight control system. Co-controller 340 may include any component of any flight controller as described above. Co-controller 340 may be implemented in any manner suitable for implementation of a flight controller as described above.

In an embodiment, and with continued reference to FIG. 3, flight controller 104 may be designed and/or configured to perform any method, method step, or sequence of method steps in any embodiment described in this disclosure, in any order and with any degree of repetition. For instance, flight controller 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 4:
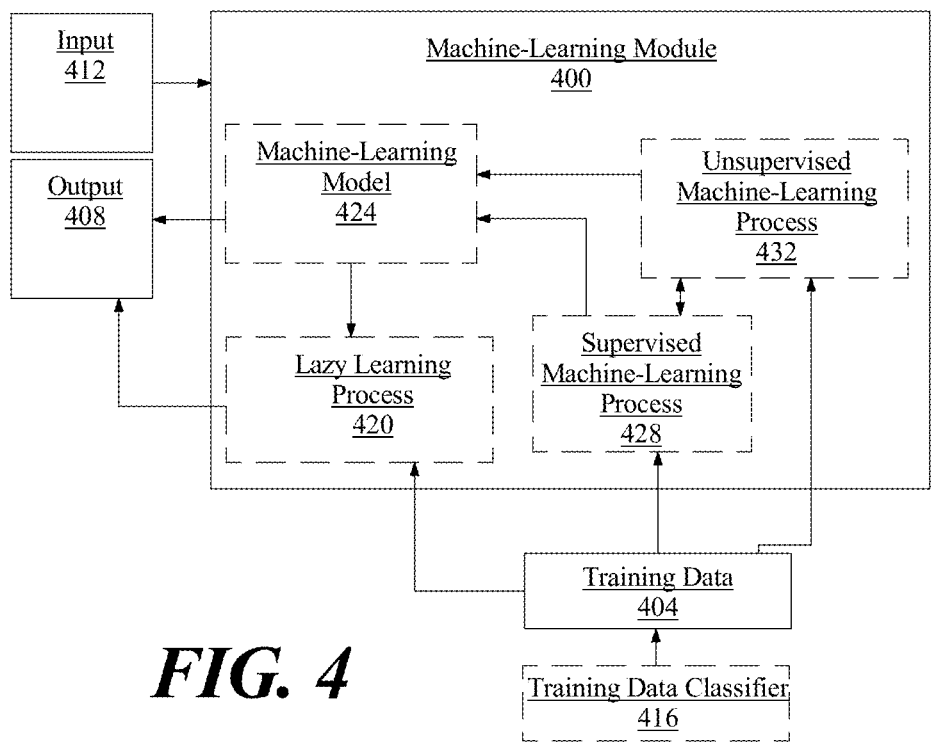
FIG. 4 is a block diagram of an exemplary embodiment of a machine-learning module.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example flight elements and/or pilot signals may be inputs, wherein an output may be an autonomous function.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 5:
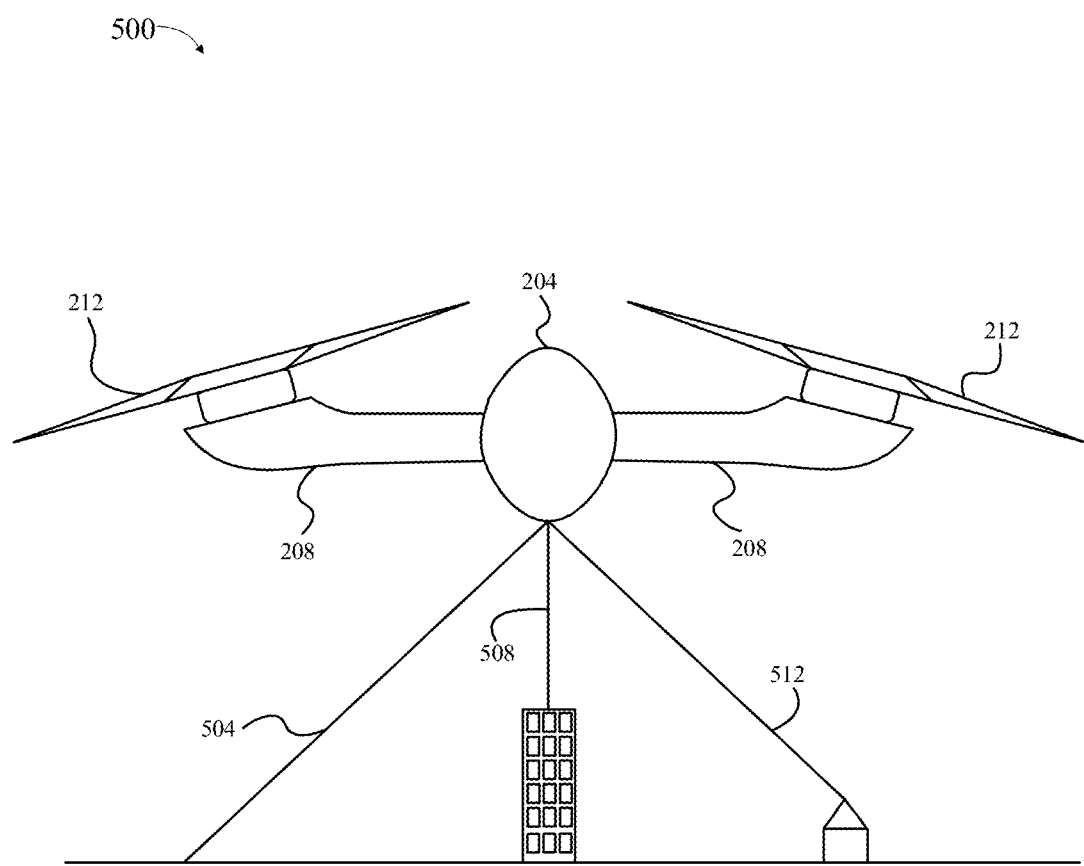
FIG. 5 is a diagrammatic representation illustrating an exemplary embodiment of a LIDAR.

Now referring to FIG. 5, an exemplary embodiment 500 of a LIDAR is illustrated. In an embodiment, and without limitation, the plurality of topographical datum may allow eVTOL aircraft 200 to utilize LIDAR to determine air position 112 as described above, in reference to FIGS. 1-4. In an embodiment, and without limitation, LIDAR may be located on a bottom portion of eVTOL aircraft 200, wherein a bottom portion is a portion of eVTOL aircraft 200 that is closest to the ground. In another embodiment, LIDAR may be downward facing. LIDAR may receive a plurality of topographical datum 108 and/or obtain a plurality of sensor datum 120 as a function of sensor 116. In an embodiment, and without limitation, LIDAR may obtain sensor datum 120 as a function of a plurality of distance measurements to a plurality of locations on the ground. As used in this disclosure a "location" is a point and/or spot on the ground that a sensor may visualize and/or obtain sensor datum from. For example, and without limitation, location may include one or more objects, structures, entities, fields, plains, oceans, and the like thereof. As a non-limiting example, a first location 504 may include a first distance of $D_1$ that may be measured from LIDAR to first location 504. As a further non-limiting example, a second location 508 may include a second distance of $D_2$ that may be measured from LIDAR to second location 508. As a further non-limiting example, a third location 512 may include a third distance of $D_3$ that may be measured from LIDAR to third location 512. In an embodiment, and without limitation, second location 508 may be directly beneath and/or below eVTOL aircraft 200, wherein second ground point 508 may be a reference and/or guide location.

Still referring to FIG. 5, LIDAR may measure a fixed angular offset as a function of an angle that extends between second location 508 and/or one or more additional locations such as first location 504, third location 512, and the like thereof. For example, and without limitation, first location 504 may correspond to a first angle comprising 7° westward, wherein third location 512 may correspond to a third angle comprising 9° eastward. Additionally or alternatively, angle may correspond to angles in a plurality of directions and/or distances. In an embodiment, and without limitation, LIDAR may use one or more compasses to identify one or more directions and/or orientations. For example, and without limitation, a plurality of compasses may have a plurality of different performance characteristics as a function of a flight environment, wherein a flight environment is a quality of a flight such as acceleration, turning, and the like thereof, and wherein the plurality of compasses may be referred to in the appropriate flight environment. As a non-limiting example, a magnetic compass may be referred to as a function of eVTOL aircraft traveling in a straight level flight environment, wherein limited and/or restricted acceleration and/or deceleration is exerted. As a further non-limiting example, a gyro-stabilized compass may be referred to as a function of eVTOL aircraft turning and/or adjusting one or more altitude angles, roll angles, and/or yaw angles. In an embodiment, and without limitation, LIDAR may store one or more ground locations and/or features of the ground location to determine air position 112.

Figure 6:
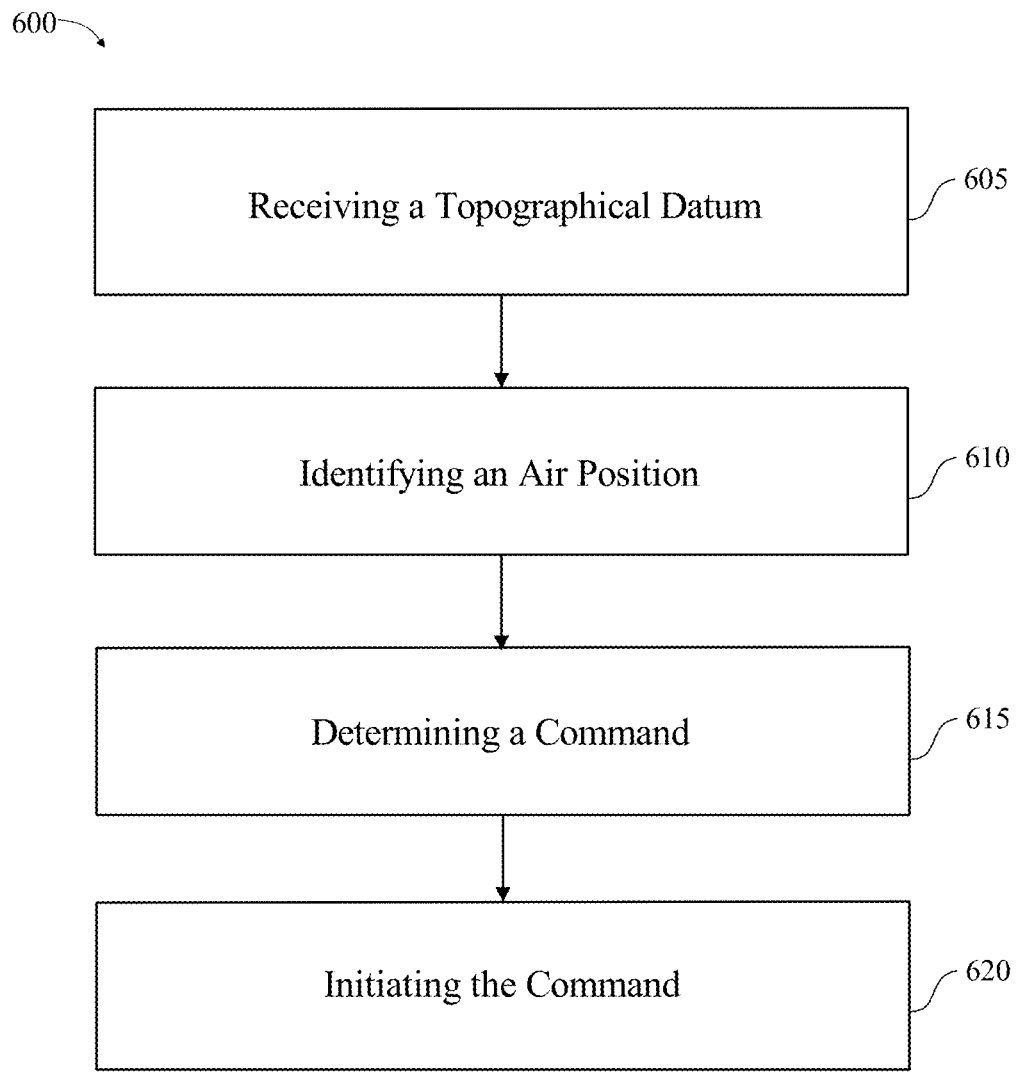
FIG. 6, is a flow diagram illustrating a method for initiating a command of an electric vertical take-off and landing (eVTOL) aircraft according to an embodiment of the invention.

Now referring to FIG. 6, an exemplary embodiment of a method 600 for initiating a command of an electric vertical take-off and landing (eVTOL) aircraft is illustrated. At step 605, a flight controller 104 receives a topographical datum 108. Flight controller 104 includes any of the flight controller 104 as described above, in reference to FIGS. 1-5. Topographical datum 108 includes any of the topographical datum 108 as described above, in reference to FIGS. 1-5.

Still referring to FIG. 6, at step 610, flight controller 104 identifies an air position 112. Air position 112 includes any of the air position 112 as described above, in reference to FIGS. 1-5. Flight controller 104 identifies air position 112 as a function of a sensor 116 and topographical datum 108. Sensor 116 includes any of the sensor 116 as described above, in reference to FIGS. 1-5. Flight controller 104 identifies air position 112 as a function of obtaining a sensor datum 120 as a function of sensor 116. Sensor datum 120 includes any of the sensor datum 120 as described above, in reference to FIGS. 1-5. Flight controller 104 identifies air position 112 as a function of sensor datum 120 and topographical datum 108 using a similarity function 124. Similarity function 124 includes any of the similarity function 124 as described above, in reference to FIGS. 1-5.

Still referring to FIG. 1, at step 615, flight controller 104 determines a command 128 as a function of air position 112. Command 128 includes any of the command 128 as described above, in reference to FIGS. 1-5.

Still referring to FIG. 1, at step 620, flight controller 104 initiates command 128. Initiating includes any of the initiating as described above, in reference to FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
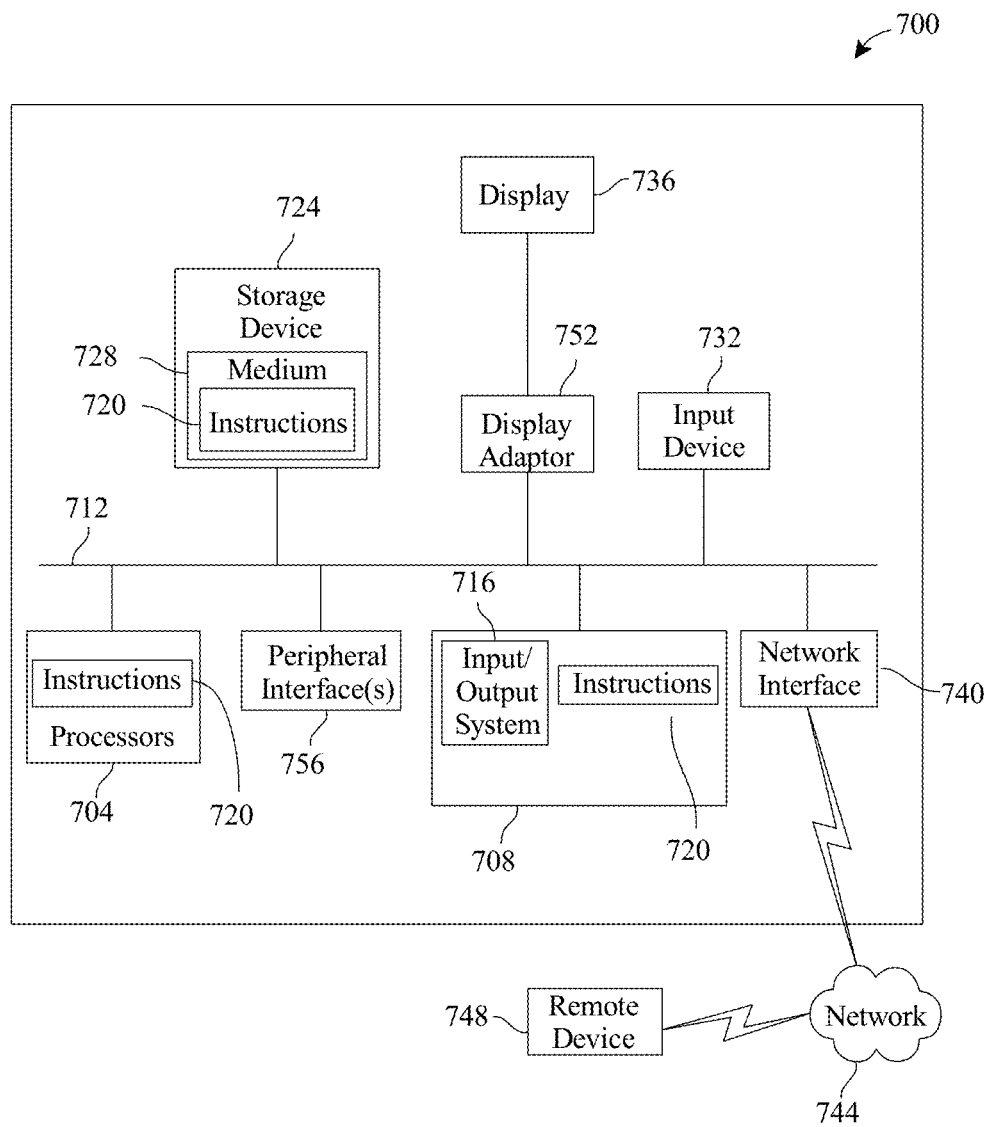
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIRE-WIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve systems and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:
1. A system for initiating a command of an electric aircraft, the system comprising:
   a flight controller, wherein the flight controller is configured to:

identify an air position as a function of a sensor datum and a topographical datum using a similarity function, wherein the air position is denoted by an image vector, wherein the image vector comprises a data structure representing a plurality of categorized distances, and wherein a first categorized distance represents a first height of the electric aircraft above a physical feature and a second categorized distance represents a second height of the physical feature above ground or sea level;

determine a flight component command as a function of the air position, wherein determining the flight component command comprises identifying a flight component of the electric aircraft to be adjusted to perform the flight component command; and initiate the flight component command to adjust the flight component.

2. The system of claim 1, wherein the topographical datum comprises a ground feature.

3. The system of claim 1, wherein topographical datum includes one or more altitude elements.

4. The system of claim 1, wherein the topographical datum comprises data generated using one or more sensors.

5. The system of claim 1, wherein the physical feature is a man-made structure.

6. The system of claim 1, wherein the flight component comprises a lift component comprising a propulsor.

7. The system of claim 1, wherein identifying the air position further comprises:
obtaining a first signal as a function of the sensor datum;
receiving a second signal as a function of the sensor datum; and
identifying the air position as a function of the first signal and the second signal using a comparator.

8. The system of claim 1, wherein identifying the air position further comprises:
receiving a position training set that correlates sensor data and topographical data; and
identifying the air position as a function of a position machine-learning model, wherein the position machine-learning model is trained as a function of the position training set.

9. The system of claim 1, wherein the flight component command comprises a thrust command.

10. The system of claim 1, wherein the sensor datum is an inertial measurement.

11. A method for initiating a command of an electric aircraft, the method comprising:
identifying, by a flight controller, an air position as a function of a sensor datum and a topographical datum using a similarity function, wherein the air position is denoted by an image vector, wherein the image vector comprises a data structure representing a plurality of categorized distances, and wherein a first categorized distance represents a first height of the electric aircraft above a physical feature and a second categorized distance represents a second height of the physical feature above ground or sea level;
determining, by the flight controller, a flight component command as a function of the air position, wherein determining the flight component command comprises identifying a flight component of the electric aircraft to be adjusted to perform the flight component command; and
initiating, by the flight controller, the flight component command to adjust the flight component.

12. The method of claim 11, further comprising receiving the topographical datum as a function of a ground database.

13. The method of claim 11, wherein topographical datum includes one or more altitude elements.

14. The method of claim 11, wherein the topographical datum comprises one or more of a LIDAR image, a 3D file, or an image file.

15. The method of claim 11, wherein the second height is a height of a structure above ground level.

16. The method of claim 11, wherein the flight component comprises a lift component comprising a propulsor.

17. The method of claim 11, wherein identifying the air position further comprises:
obtaining a first signal as a function of the sensor datum;
receiving a second signal as a function of the sensor datum; and
identifying the air position as a function of the first signal and the second signal using a comparator.

18. The method of claim 11, wherein identifying the air position further comprises:
receiving a position training set that correlates the sensor datum and the topographical datum; and
identifying the air position as a function of a position machine-learning model, wherein the position machine-learning model is trained as a function of the position training set.

19. The method of claim 11, wherein the flight component command comprises a thrust command.

20. The method of claim 11, wherein the sensor datum is an inertial measurement.

* * * * *